(12) United States Patent
Friedrich

(10) Patent No.: US 10,066,503 B2
(45) Date of Patent: Sep. 4, 2018

(54) BEARING HOUSING OF AN EXHAUST-GAS TURBOCHARGER

(71) Applicant: BorgWarner Inc., Auburn Hills, MI (US)

(72) Inventor: Peter Friedrich, Lampertheim (DE)

(73) Assignee: BorgWarner Inc., Auburn Hills, MI (US)

( * ) Notice: Subject to any disclaimer, the term of this patent is extended or adjusted under 35 U.S.C. 154(b) by 481 days.

(21) Appl. No.: 14/360,962

(22) PCT Filed: Nov. 28, 2012

(86) PCT No.: PCT/US2012/066781
§ 371 (c)(1),
(2) Date: May 28, 2014

(87) PCT Pub. No.: WO2013/085766
PCT Pub. Date: Jun. 13, 2013

(65) Prior Publication Data
US 2014/0341732 A1 Nov. 20, 2014

(30) Foreign Application Priority Data

Dec. 9, 2011 (DE) ........................ 10 2011 120 701

(51) Int. Cl.
F01D 25/16 (2006.01)
F01D 25/24 (2006.01)
(Continued)

(52) U.S. Cl.
CPC ............. *F01D 25/16* (2013.01); *F01D 25/24* (2013.01); *F01D 25/243* (2013.01); *F16C 33/02* (2013.01);
(Continued)

(58) Field of Classification Search
CPC ...... F01D 25/24; F01D 25/243; F04D 29/403; F04D 29/4206; F16C 35/02; F16C 35/10
See application file for complete search history.

(56) References Cited

U.S. PATENT DOCUMENTS 4,986,675 A * 1/1991 Dye ........................ F16C 23/04
384/192
7,074,009 B2 * 7/2006 Allmang ................. F01D 9/026
415/177

(Continued)

FOREIGN PATENT DOCUMENTS

KR 20090111085 A 10/2009

OTHER PUBLICATIONS

International Search Report in International Application No. PCT/US2012/066781, dated Feb. 26, 2013.

Primary Examiner — Woody Lee, Jr.
Assistant Examiner — Cameron Corday
(74) Attorney, Agent, or Firm — Eric L. Doyle; Stephan A. Pendorf; Patent Central LLC

(57) ABSTRACT

A bearing housing (1) of an exhaust-gas turbocharger (2) having a turbine-side flange (3), having a compressor-side flange (4) and having a center part (5) which is arranged between the turbine-side flange (3) and the compressor-side flange (4). The turbine-side flange (3), the compressor-side flange (4) and the center part (5) are separate components which are connected to one another in the fully assembled state by a connection device (6) or thermally or by adhesive bonding.

10 Claims, 5 Drawing Sheets

(51) Int. Cl.
*F16C 33/02* (2006.01)
*F16C 37/00* (2006.01)

(52) U.S. Cl.
CPC .......... *F16C 37/00* (2013.01); *F05D 2220/40* (2013.01); *F05D 2240/50* (2013.01); *F05D 2300/121* (2013.01)

(56) References Cited

U.S. PATENT DOCUMENTS

| | | | |
|---|---|---|---|
| 2004/0088976 A1* | 5/2004 | Jaisle | F01D 11/04 60/602 |
| 2006/0269437 A1* | 11/2006 | Pandey | C22F 1/04 420/550 |
| 2007/0280824 A1 | 12/2007 | Ward | |
| 2010/0054934 A1* | 3/2010 | Boning | F01D 25/243 415/214.1 |
| 2010/0212744 A1* | 8/2010 | Braun | F16C 17/02 137/1 |
| 2011/0038717 A1 | 2/2011 | Lee et al. | |
| 2011/0103948 A1 | 5/2011 | Kuzi | |
| 2011/0296835 A1 | 12/2011 | Ebisu | |

\* cited by examiner

BEARING HOUSING OF AN EXHAUST-GAS TURBOCHARGER

The invention relates to a bearing housing of an exhaust-gas turbocharger according to the preamble of claim 1.

A bearing housing of the generic type has a turbine-side flange, a compressor-side flange and a center part which is arranged therebetween and in which the bearings for the shaft of the exhaust-gas turbocharger and also oil and possibly water lines and connections are arranged. The two flanges and the center part in this case form a single-piece component which, for example, is cast.

In view of this, it is an object of the present invention to provide a bearing housing of the type specified in the preamble of claim 1 which has a reduced weight and which has reduced production costs.

This object is achieved by the features of claim 1.

According to the invention, provision is made of a bearing housing with a modular design, which is distinguished by the fact that the turbine-side flange and the compressor-side flange and also the center part are each separate components which are connected to one another in the fully assembled state by means of a mechanical connection device or suitable thermal (welding, soldering . . . ) or chemical (adhesive bonding) processes.

Since the components mentioned above are separate components, it is possible to form the center part as an extruded part, preferably an extruded aluminum part. Therefore, all of the media-conducting elements of the bearing housing according to the invention are in the form of extruded parts, with it being possible to use a high-performance polymer instead of aluminum for an outer water jacket which may be provided.

The flanges can be in the form of turned parts, and all the media connections can be fitted in a customized manner, for example in the form of corresponding pipes (e.g. by friction welding).

This results in the advantage of a considerable reduction in weight compared to the bearing housing of the generic type and in a reduction in costs resulting from the use of standardized components which differ only in terms of machining Connections which are not required no longer have to be closed, as in the case of known bearing housings, since they are only introduced as required. In addition, better thermal decoupling between the hot turbine side and the cold compressor side is advantageously achieved.

Dependent claims 2 to 12 contain advantageous developments of the invention.

Claims 13 and 14 define an exhaust-gas turbocharger as an object which can be dealt with independently.

Further details, advantages and features of the present invention become apparent from the following description of exemplary embodiments with reference to the drawing, in which:

FIG. 1 shows an exhaust-gas turbocharger 2 according to the invention, having a turbine T and a compressor VD which are connected to one another by way of a bearing housing 1, in which there is mounted a shaft W.

Figure 2:
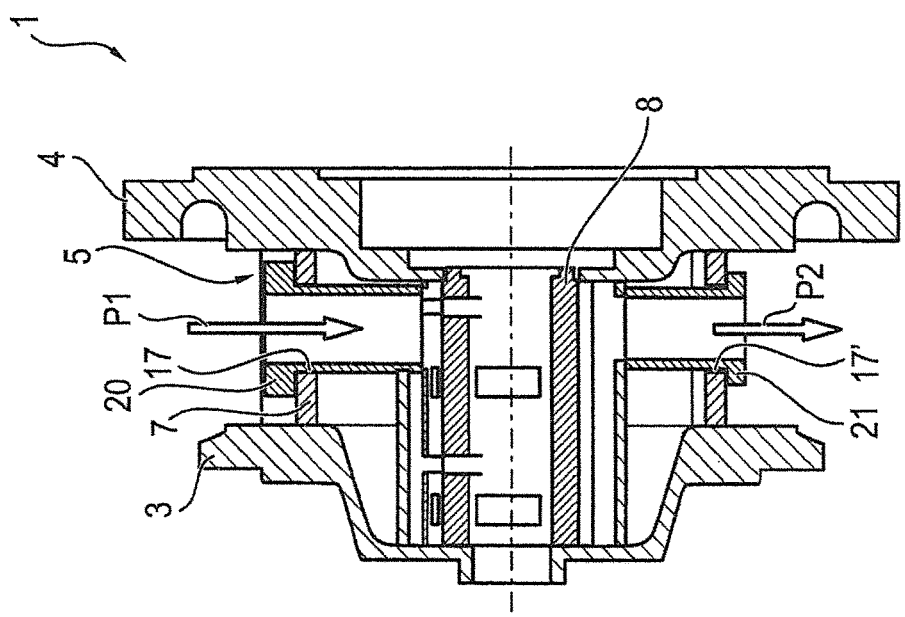

As is apparent from the longitudinal sectional illustration through the bearing housing 1 in FIG. 2, the bearing housing 1 has, as separate components, a turbine-side flange 3, a compressor-side flange 4 and also a center part 5 which is arranged between the turbine-side flange 3 and the compressor-side flange 4. The center part 5 has an outer part 7 and a bearing support 8 which is inserted into the outer part 7. In the center part 5, an oil inlet bush 20 and an oil outlet bush 21 are additionally provided in recesses 17, 17', through which oil is fed to the bearing support 8 in the arrow direction P1 or oil is discharged from said bearing support 8 in the arrow direction P2.

Figure 3:
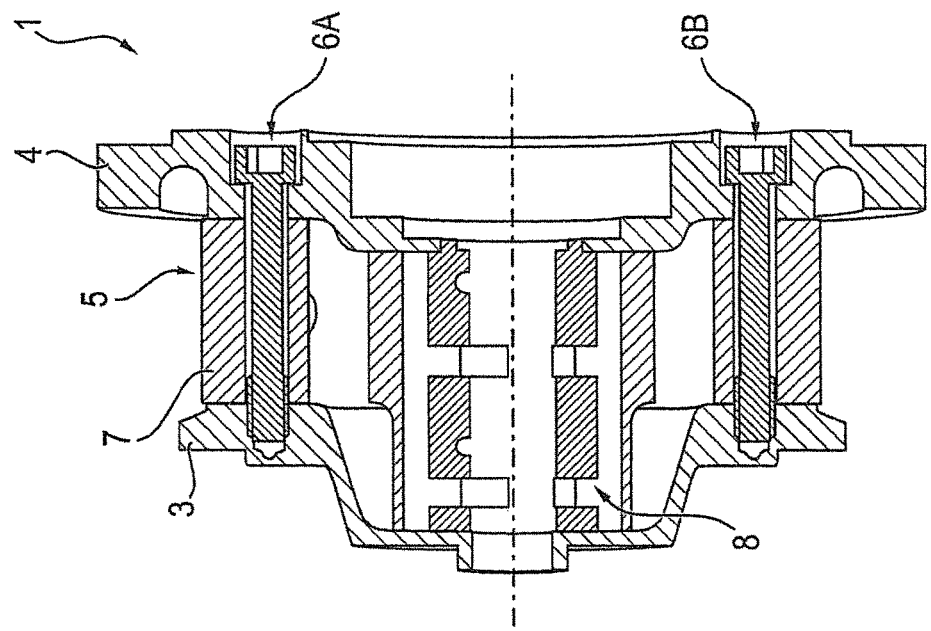
FIGS. 2 and 3 show longitudinal sections through the bearing housing according to the invention in different sectional planes.

As is apparent from the longitudinal sectional illustration in FIG. 3, the turbine-side flange 3, the compressor-side flange 4 and the center part 5 are connected to one another by means of a connection device which is in the form of a screwed connection 6 having a plurality of circumferentially arranged tie rods, of which merely two tie rods 6A and 6B can be seen in the sectional illustration in FIG. 3.

Figure 5:
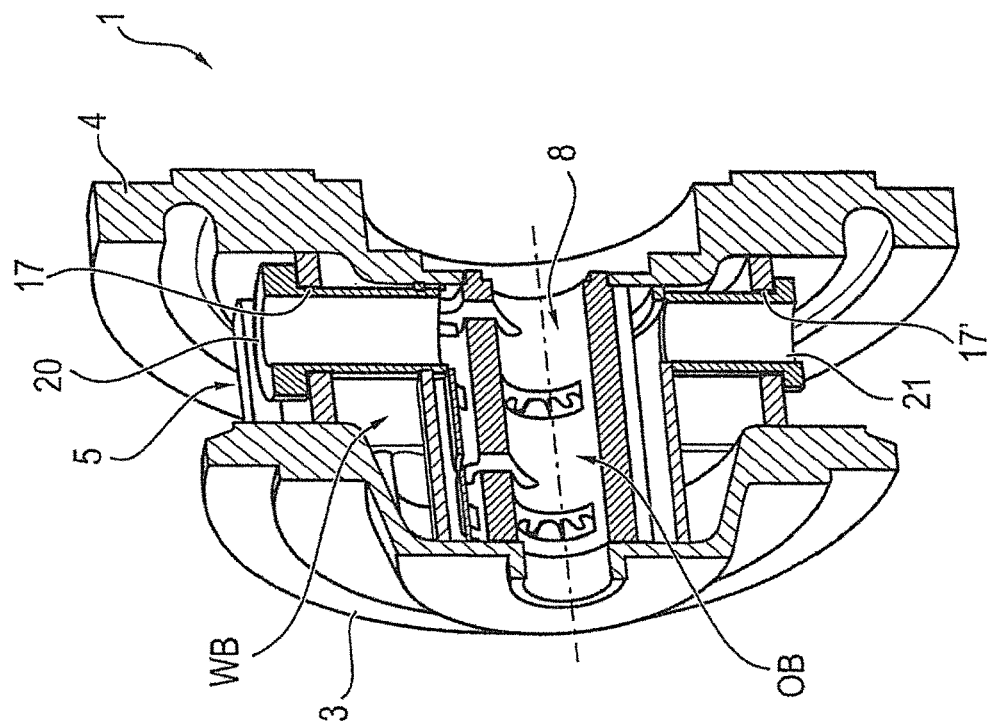
FIG. 5 shows a sectional perspective illustration of the bearing housing shown in FIGS. 2 to 4.
Figure 4:
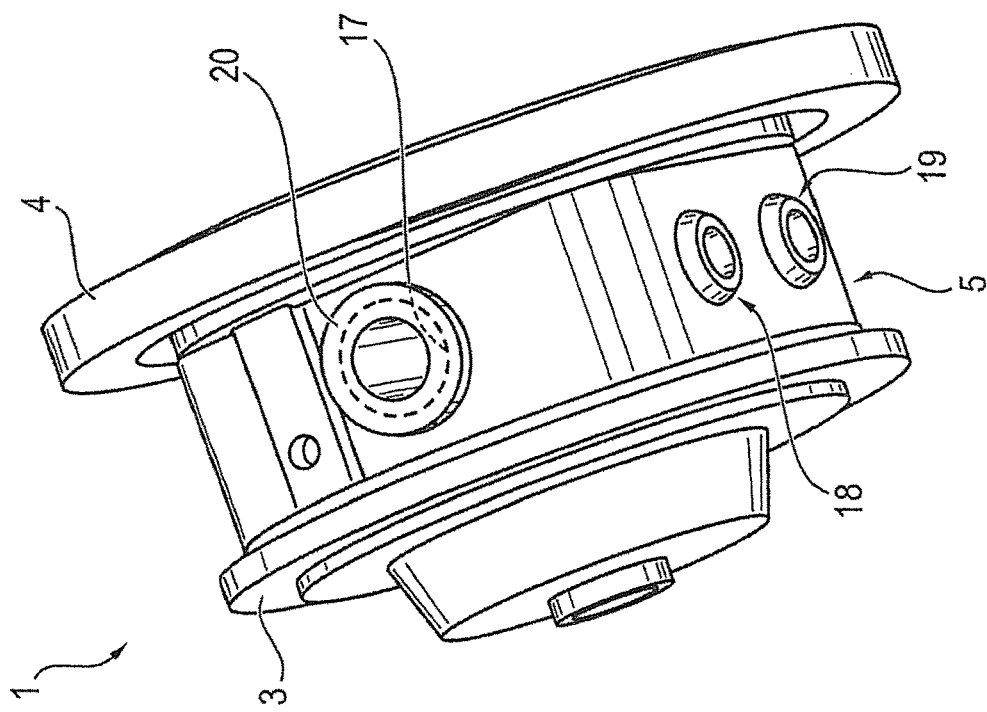
FIG. 4 shows a perspective illustration of the bearing housing according to the invention shown in FIGS. 2 and 3.
Figure 8:
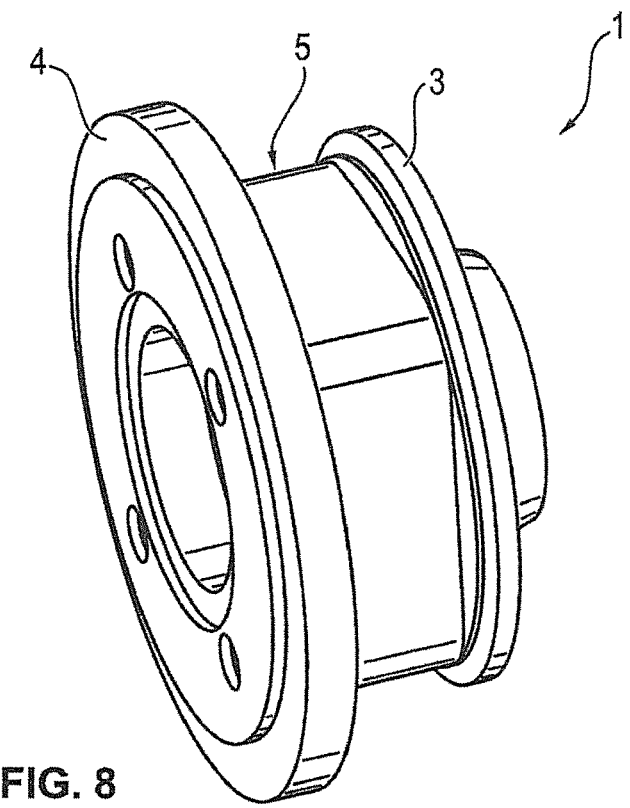
FIG. 8 shows a perspective illustration of the bearing housing according to the invention without fitted oil and water connections.

As shown in the perspective view in FIG. 4, further recesses 18, 19 for the connection of water feed/discharge lines are additionally provided on the outer circumference of the center part 5. As shown in FIG. 5, the interior of the center part 5 is divided into an oil region OB inside the bearing support 8 and also a water region WB outside the bearing support 8 by the thus arranged oil or water feed/discharge lines 17, 17', 18 or 19. FIG. 8 shows the bearing housing 1 still without recesses provided for oil and/or water connections.

Figure 1:
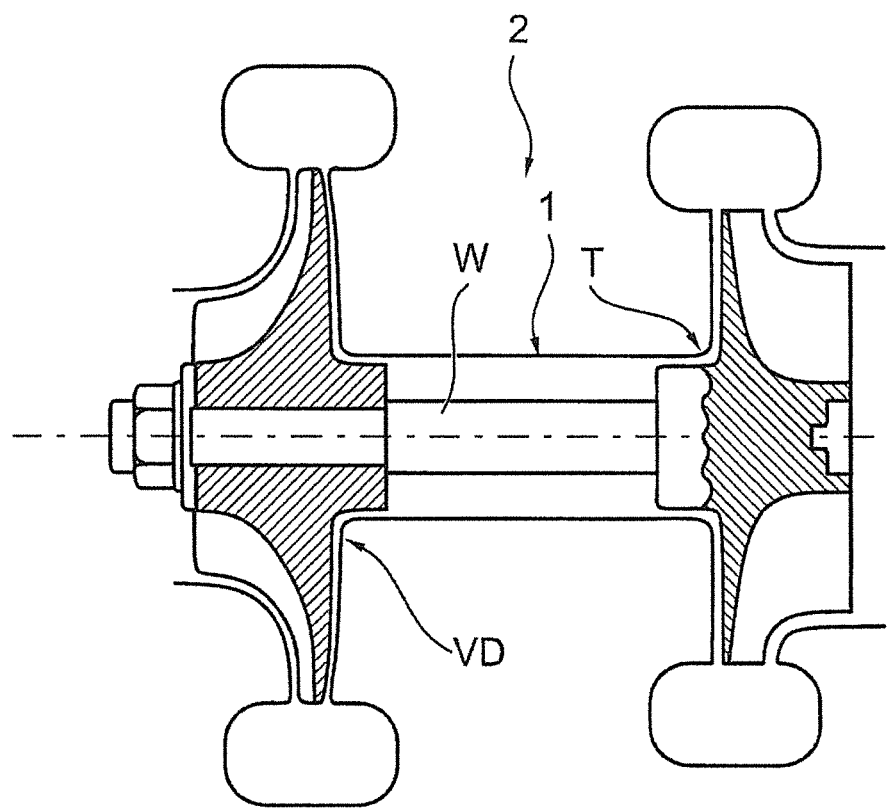
FIG. 1 shows a schematically greatly simplified illustration of an exhaust-gas turbocharger according to the invention.
Figure 6:
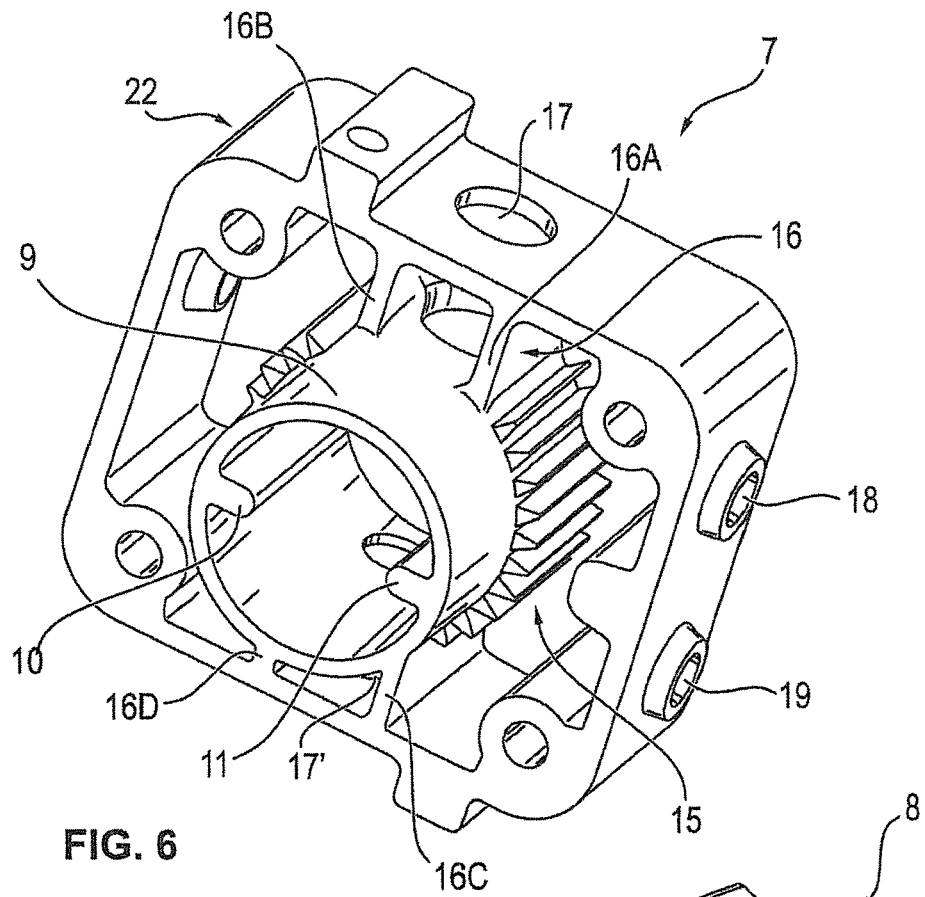
FIG. 6 shows a perspective illustration of the outer part of a center part of the bearing housing according to the invention.
Figure 7:
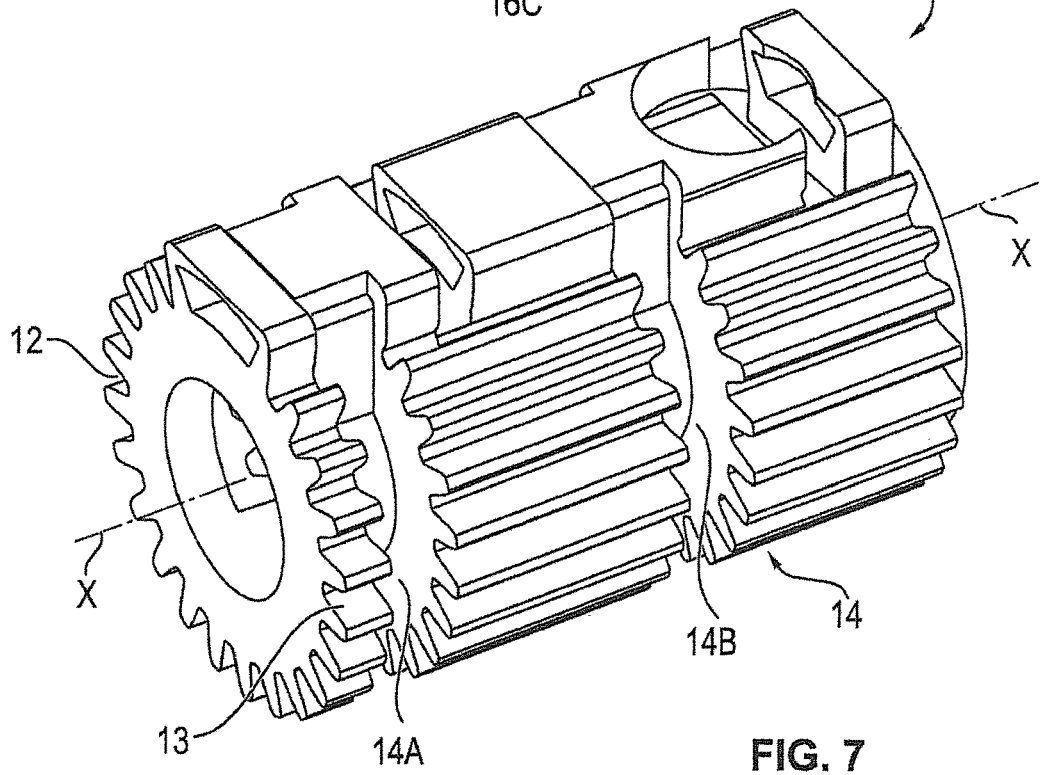
FIG. 7 shows a perspective illustration of a bearing support of the bearing housing according to the invention.
Figure 9:
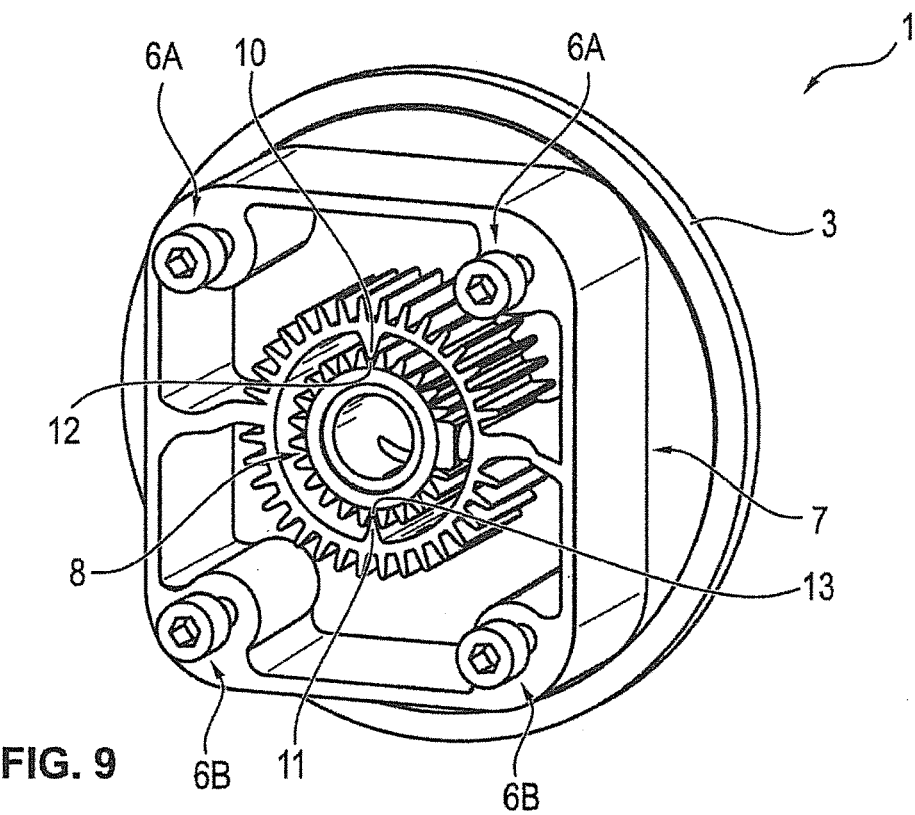
FIG. 9 shows an internal view of the bearing housing to illustrate the arrangements of the outer part and of the bearing support.

As is apparent from FIG. 6, the outer part 7 comprises a guide bush 9, which is held in a supporting frame 22 of the outer part 7 by way of a web arrangement 16 having webs 16A, 16B, 16C and 16D. The outside of the guide bush 9 is provided with a cooling fin arrangement 15 for heat dissipation. Two guide ribs 10, 11 are arranged inside the guide bush 9 and engage into guide grooves 12, 13 of the bearing support 8, shown in FIG. 7, which are part of a cooling fin arrangement 14 formed on the outside of the bearing support 8. As is further apparent from FIG. 7, the cooling fin arrangement 14 is interrupted in the axial direction X-X by means of two recesses 14A and 14B, in order to ensure that oil flows through the inside of the guide bush 9 in the fully assembled state (cf. FIG. 1, from the oil inlet bush 20 to the oil outlet bush 21). FIG. 9 shows an internal view of the bearing housing 1 to illustrate the arrangement of the outer part 7 in relation to the bearing support 8 in the fully assembled state.

To supplement the disclosure, in addition to the above written disclosure of the invention, reference is hereby explicitly made to the diagrammatic illustration thereof in FIG. 1 to FIG. 9.

LIST OF REFERENCE SYMBOLS

1 Bearing housing
2 Exhaust-gas turbocharger

3 Turbine-side flange
4 Compressor-side flange
5 Center part
6 Connection device, screwed connection
7 Outer part
8 Bearing support
9 Guide bush
10, 11 Guide rib
12, 13 Guide groove
14 Cooling fin arrangement
14A, 14B Recesses
15 Cooling fin arrangement
16 Web arrangement
16A, 16B, 16C, 16D Webs
17, 17', 18, 19 Recesses
20 Oil inlet bush
21 Oil outlet bush
22 Supporting frame
OB Oil region
WB Water region
T Turbine
VD Compressor
W Shaft
X-X Axial direction

The invention claimed is:

1. A bearing housing (1) of an exhaust-gas turbocharger (2) having
   a turbine-side flange (3);
   a compressor-side flange (4); and
   a center part (5) which is arranged between the turbine-side flange (3) and the compressor-side flange (4),
   wherein
   the turbine-side flange (3) and the compressor-side flange (4) are radial flanges extending radially beyond the center part (5),
   the turbine-side flange (3), the compressor-side flange (4) and the center part (5) are separate components which are connected to one another in the fully assembled state by means of a connection device (6), and
   the center part (5) includes
      an outer part (7) forming an outer surface of the bearing housing center part and having a guide bush (9) internally, the guide bush (9) having a radially outer surface and a radially inner surface,
      a bearing support (8) having a radially outer surface and a radially inner surface, wherein the bearing support (8) is inserted into the guide bush (9) of the outer part (7) and which has oil slots (14A, 14B),
      an oil inlet bush (20) extending through an opening (17) in the outer part (7) and in communication with the oil slots (14A, 14B) in the bearing support (8), and
      an oil outlet bush (21) extending through an opening (17') in the outer part (7) and in communication with the oil slots (14A, 14B) in the bearing support (8),
   such that said oil inlet bush (20), a space between said outer part (7) guide bush (9) radially inner surface and said bearing support (8) radially outer surface, said oil slots (14A, 14B), and said oil outlet bush (21) cooperate to define an oil lubrication flow path.

2. The bearing housing as claimed in claim 1, wherein the guide bush (9) has at least one guide rib (10, 11) which, in the fitted state of the bearing support (8), engages into a guide groove (12, 13) in the bearing support (8).

3. The bearing housing as claimed in claim 2, wherein the outside of the guide bush (9) is provided with a cooling fin arrangement (15).

4. The bearing housing as claimed in claim 2, wherein the guide bush (9) is held in a supporting frame (21) of the outer part (7) by way of a web arrangement (16).

5. The bearing housing as claimed in claim 4, wherein the center part (5) is provided with ports (18, 19) and water feed lines (18,19).

6. The bearing housing as claimed in claim 1, wherein the outside of the bearing support (8) is provided with a cooling fin arrangement (14).

7. The bearing housing as claimed in claim 1, wherein the outer part and bearing support are aluminum.

8. The bearing housing as claimed in claim 1, wherein the connection device (6) is a screwed connection.

9. The bearing housing as claimed in claim 8, wherein the screwed connection (6) has tie rods (6A, 6B).

10. The bearing housing as claimed in claim 1, wherein the connection device (6) between the center part (5) outer part (7) and bearing support (8) and turbine-side flange (3), the compressor-side flange (4) is in the form of a thermal connection device or of a form-fitting device.

* * * * *